United States Patent
Guleryuz et al.

(10) Patent No.: US 10,390,025 B2
(45) Date of Patent: Aug. 20, 2019

(54) METHOD AND APPARATUS FOR ENCODING AND DECODING VIDEO SIGNAL USING IMPROVED PREDICTION FILTER

(71) Applicant: LG Electronics Inc., Seoul (KR)

(72) Inventors: Onur Guleryuz, San Jose, CA (US); Shunyao Li, San Jose, CA (US); Sehoon Yea, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 8 days.

(21) Appl. No.: 15/516,270

(22) PCT Filed: Jun. 25, 2015

(86) PCT No.: PCT/KR2015/006465
§ 371 (c)(1),
(2) Date: Mar. 31, 2017

(87) PCT Pub. No.: WO2016/052836
PCT Pub. Date: Apr. 7, 2016

(65) Prior Publication Data
US 2017/0310974 A1    Oct. 26, 2017

Related U.S. Application Data

(60) Provisional application No. 62/063,350, filed on Oct. 13, 2014, provisional application No. 62/058,628, filed on Oct. 1, 2014.

(51) Int. Cl.
*H04N 19/50* (2014.01)
*H04N 19/172* (2014.01)
(Continued)

(52) U.S. Cl.
CPC ......... *H04N 19/172* (2014.11); *H04N 19/117* (2014.11); *H04N 19/149* (2014.11);
(Continued)

(58) Field of Classification Search
USPC ................................................ 375/240.03
See application file for complete search history.

(56) References Cited

U.S. PATENT DOCUMENTS

2006/0294171 A1    12/2006  Bossen et al.
2009/0060362 A1*    3/2009  Harmanci ............ H04N 19/139
                                          382/238
(Continued)

FOREIGN PATENT DOCUMENTS

CN    101971632    2/2011
CN    103392338    11/2013
(Continued)

OTHER PUBLICATIONS

Extended European Search Report in European Application No. 15847942.8, dated Apr. 20, 2018, 9 pages.
(Continued)

*Primary Examiner* — Behrooz M Senfi
(74) *Attorney, Agent, or Firm* — Fish & Richardson P.C.

(57) ABSTRACT

A method of encoding a video signal includes selecting a set of base filter kernels from a filter bank; determining a prediction filter parameter based on the set of base filter kernels; performing a filtering of a reference region for a target region based on the prediction filter parameter; and predicting the target region based on the filtered reference region, wherein the prediction filter parameter includes at least one of modulation scalar and partition information.

10 Claims, 18 Drawing Sheets

(51) Int. Cl.

| | |
|---|---|
| *H04N 19/46* | (2014.01) |
| *H04N 19/85* | (2014.01) |
| *H04N 19/117* | (2014.01) |
| *H04N 19/176* | (2014.01) |
| *H04N 19/149* | (2014.01) |
| *H04N 19/82* | (2014.01) |
| *H04N 19/119* | (2014.01) |
| *H04N 19/66* | (2014.01) |

(52) U.S. Cl.
CPC .......... *H04N 19/176* (2014.11); *H04N 19/46* (2014.11); *H04N 19/50* (2014.11); *H04N 19/82* (2014.11); *H04N 19/85* (2014.11); *H04N 19/119* (2014.11); *H04N 19/66* (2014.11)

(56) References Cited

U.S. PATENT DOCUMENTS

| | | |
|---|---|---|
| 2012/0063691 A1 | 3/2012 | Yu et al. |
| 2013/0129241 A1* | 5/2013 | Wang ................ G06T 9/004 382/233 |
| 2013/0215959 A1 | 8/2013 | Chen et al. |
| 2016/0345026 A1* | 11/2016 | Guleryuz .............. H04N 19/80 |

FOREIGN PATENT DOCUMENTS

| | | |
|---|---|---|
| CN | 103597835 | 2/2014 |
| CN | 105874790 | 8/2016 |
| EP | 2709364 A1 | 3/2014 |
| JP | 2006295913 A1 | 10/2006 |
| JP | 2012044239 A1 | 3/2012 |
| JP | 2013009241 A1 | 1/2013 |
| KR | 1020130056190 A | 5/2013 |
| KR | 1020130095279 A | 8/2013 |
| WO | WO2008148272 A1 | 12/2008 |
| WO | WO2009088340 A1 | 7/2009 |
| WO | WO2010137322 A1 | 12/2010 |
| WO | WO2013106888 A1 | 7/2013 |

OTHER PUBLICATIONS

International Search Report in International Application No. PCT/KR2015/006465, dated Sep. 24, 2016, 11 pages.

Atzori et al., "Adaptive anisotropic filtering (AAF) for real-time visual enhancement of MPEG-coded video sequences," IEEE Transactions on Circuits and Systems for Video Technology, May 2002, 12(5): 285-298.

Chinese Office Action in Chinese Application No. 201580059726.5, dated May 7, 2019, 14 pages (with English translation).

* cited by examiner

[Figure 1]
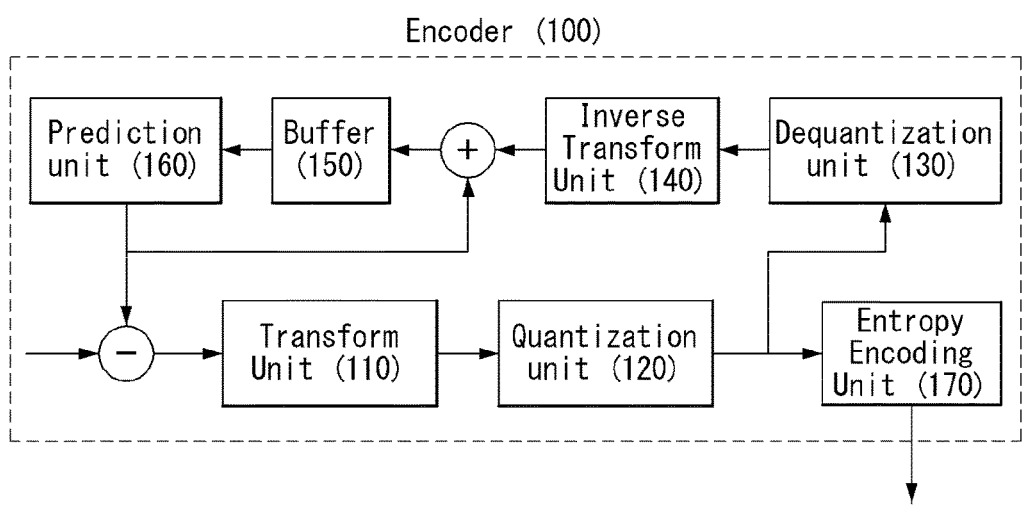

【Figure 2】
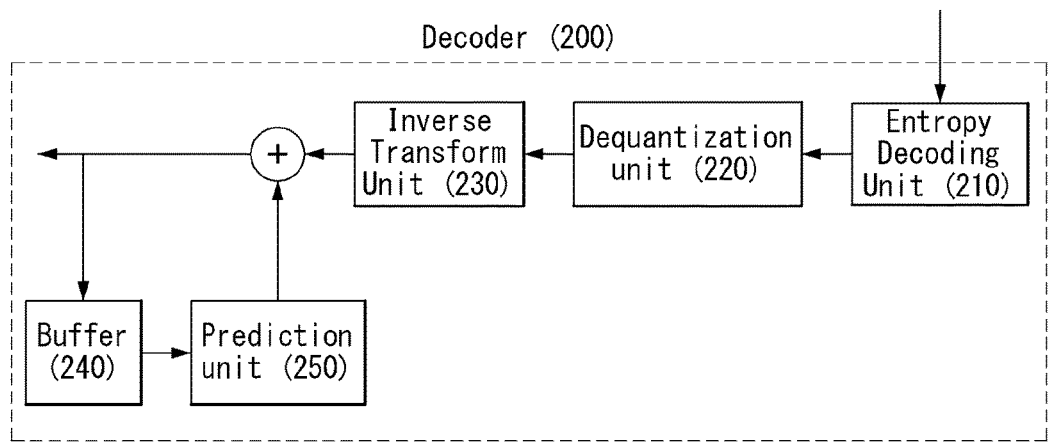

[Figure 3]
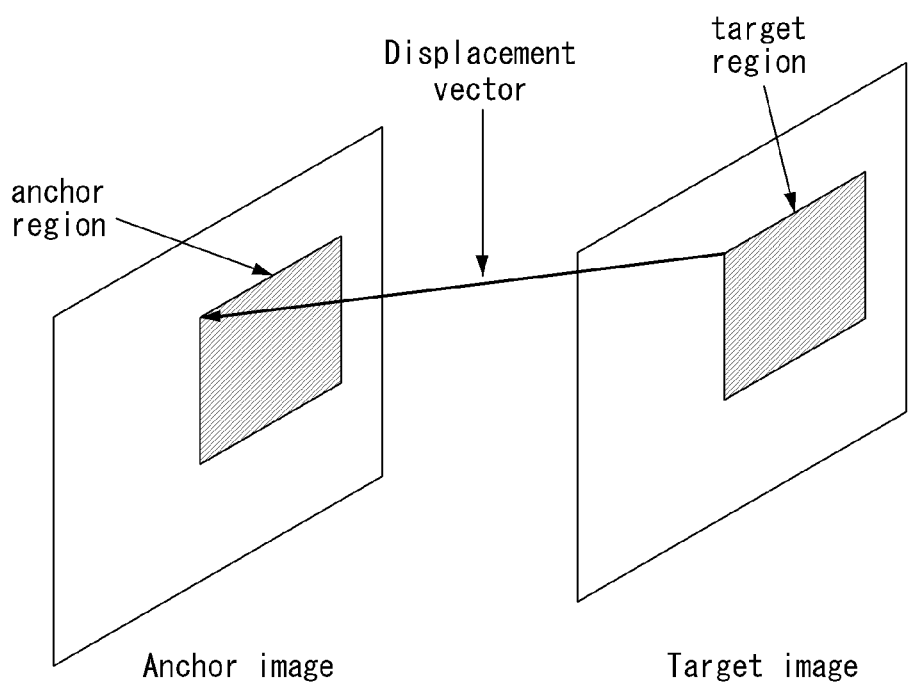

[Figure 4]
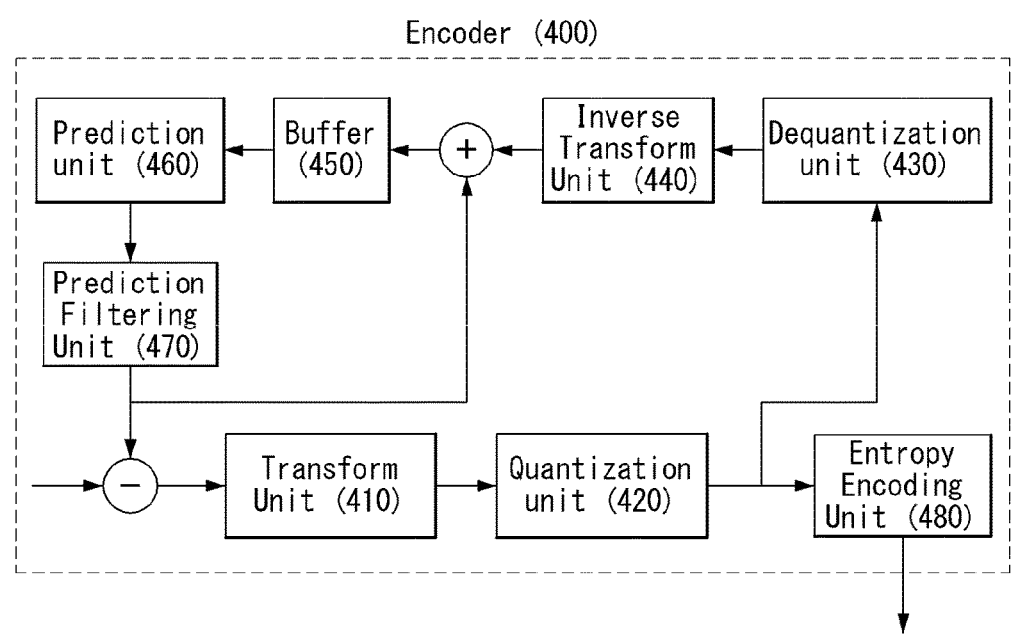

【Figure 5】
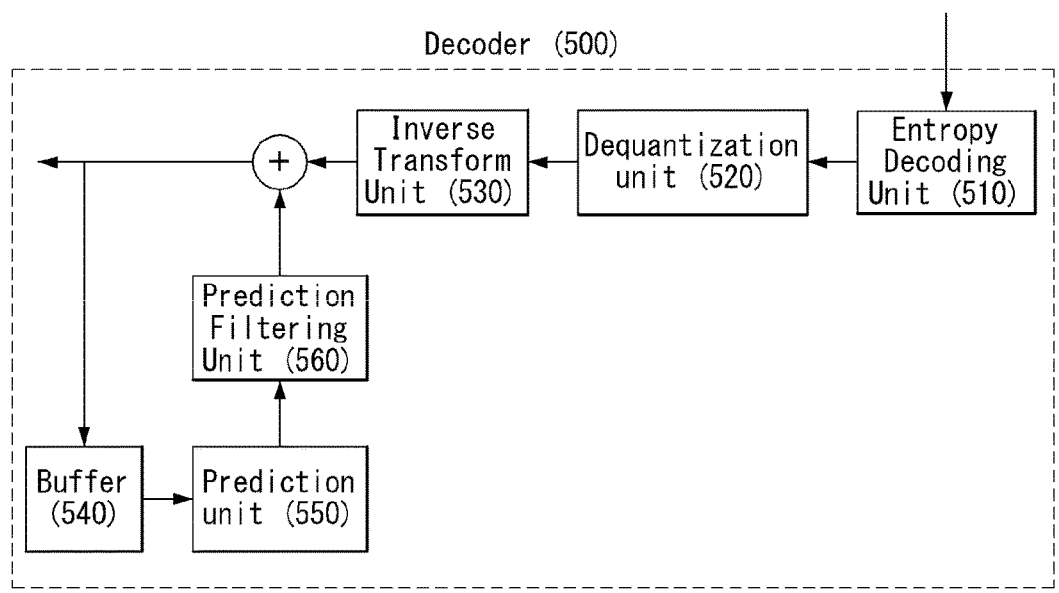

【Figure 6】
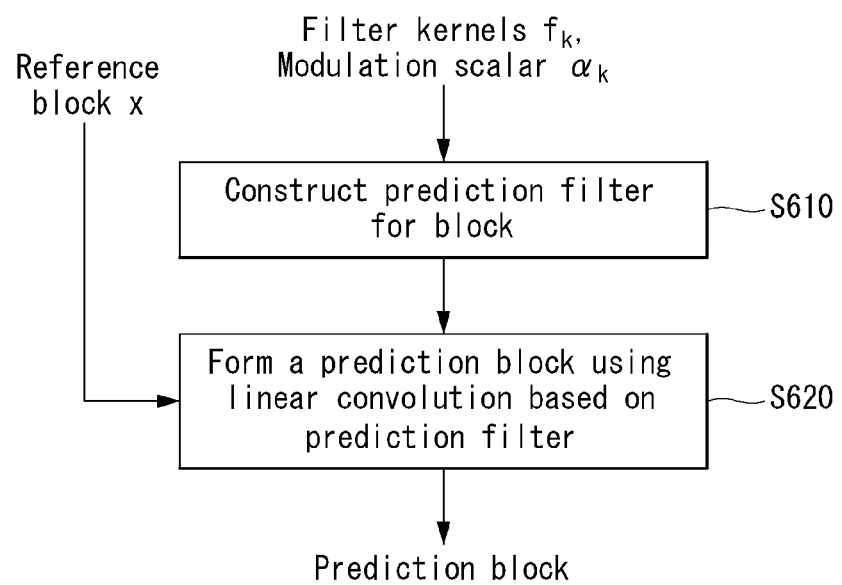

【Figure 7】
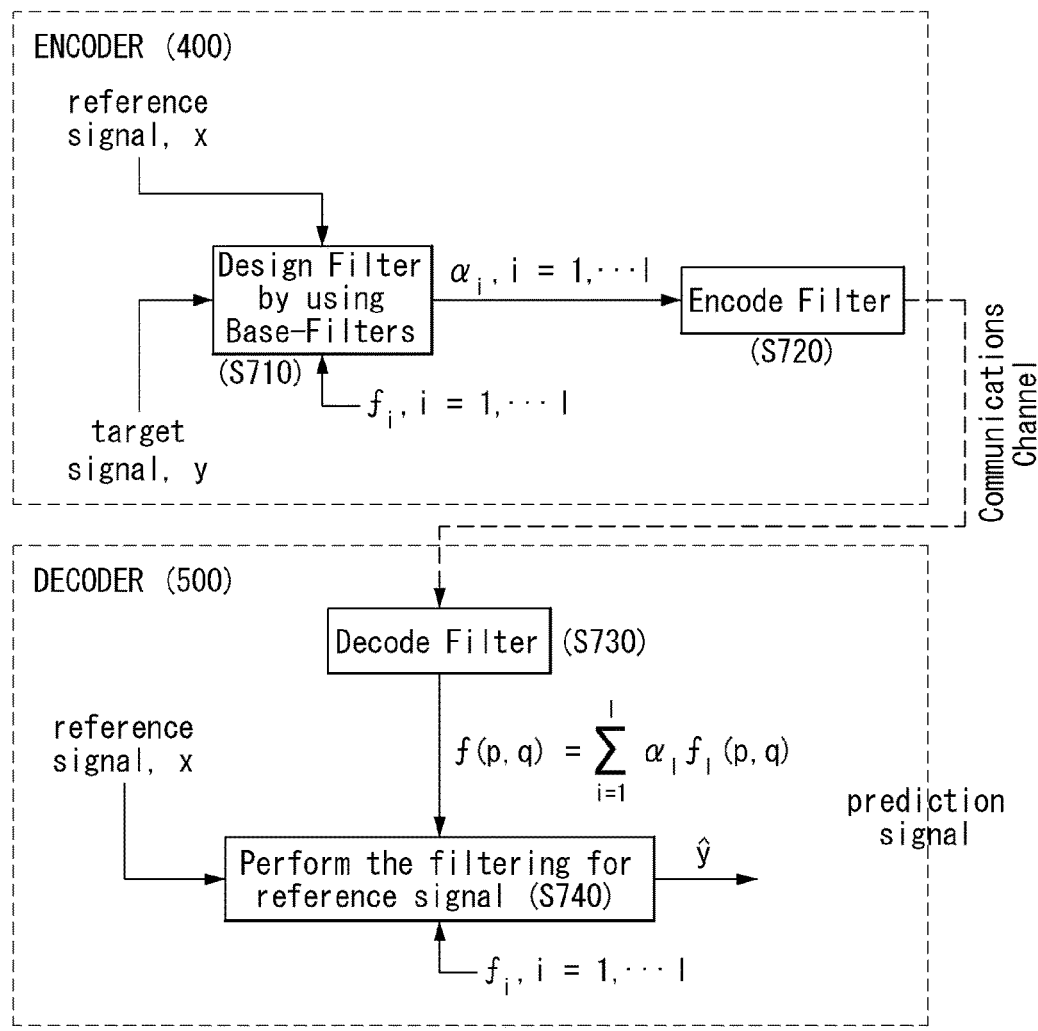

【Figure 8】
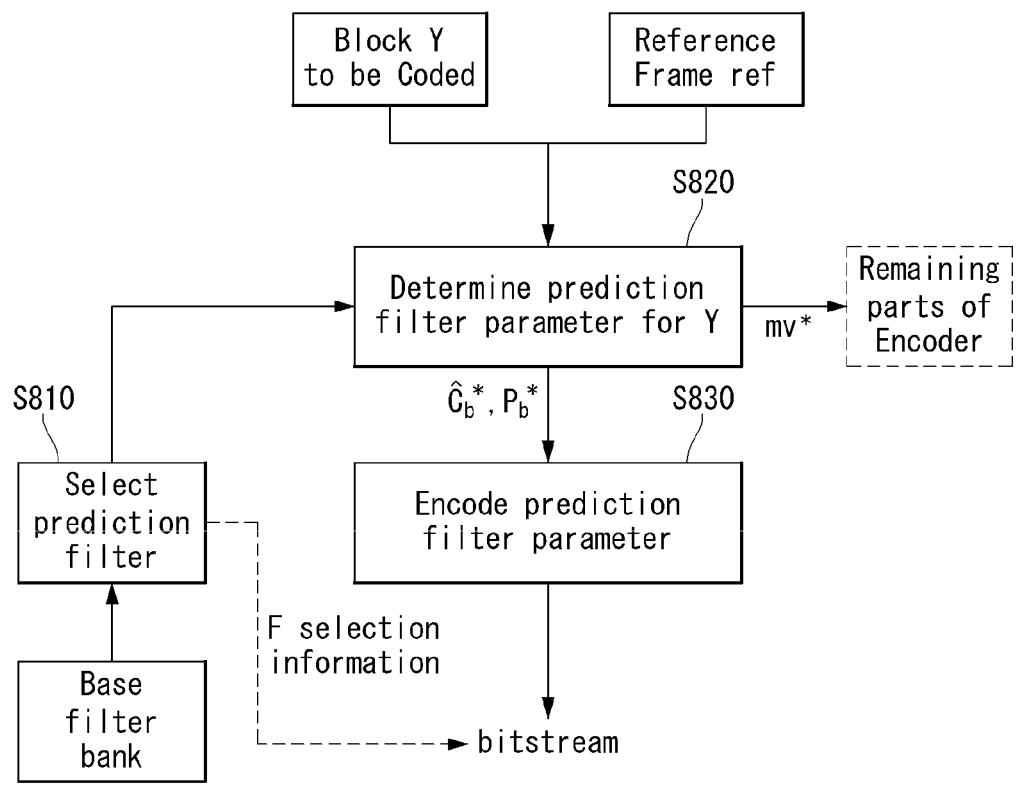

[Figure 9]
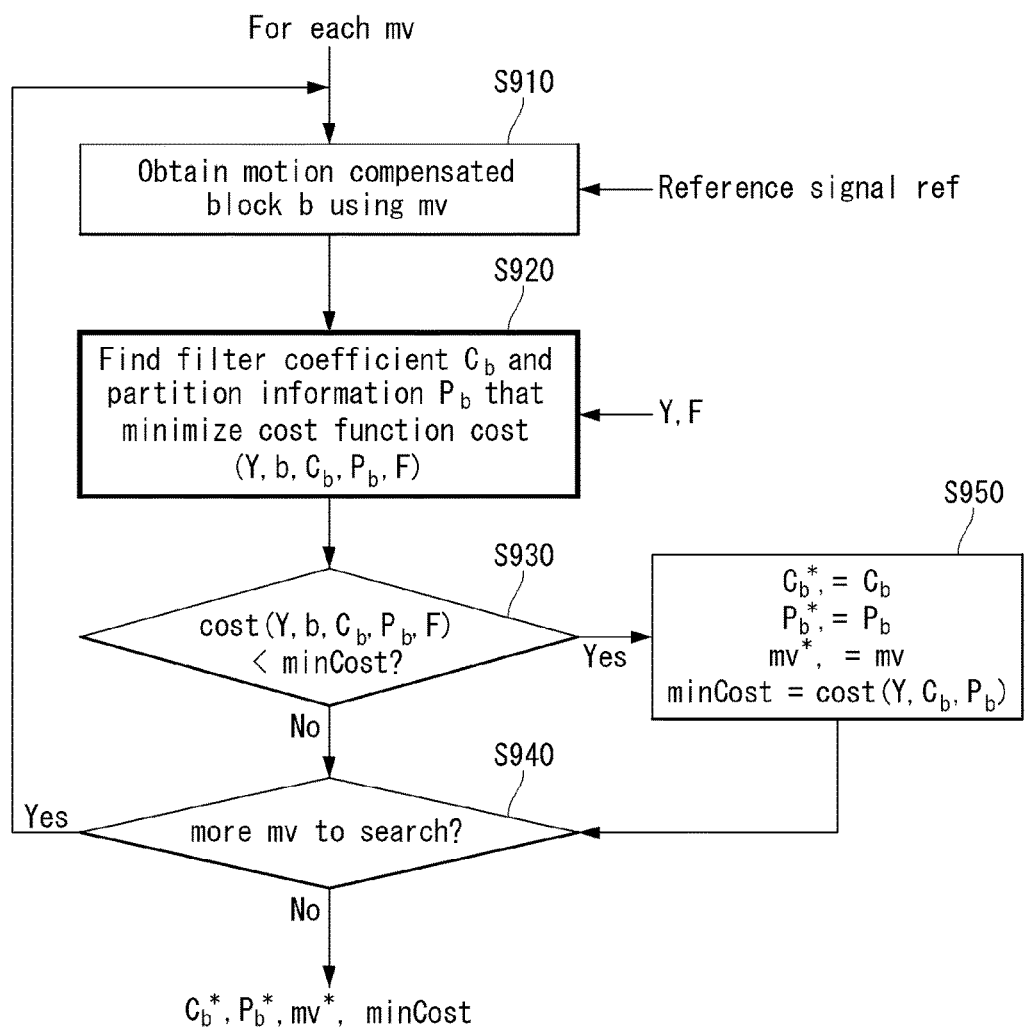

[Figure 10]
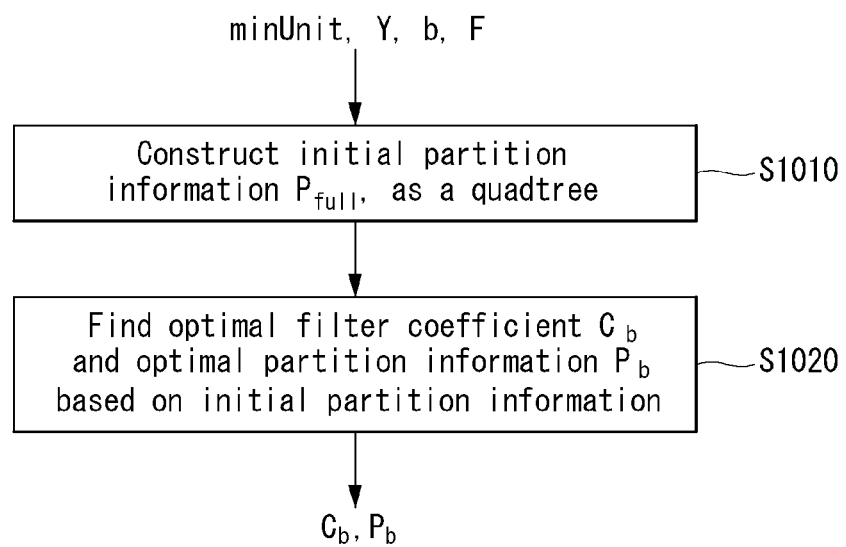

[Figure 11]
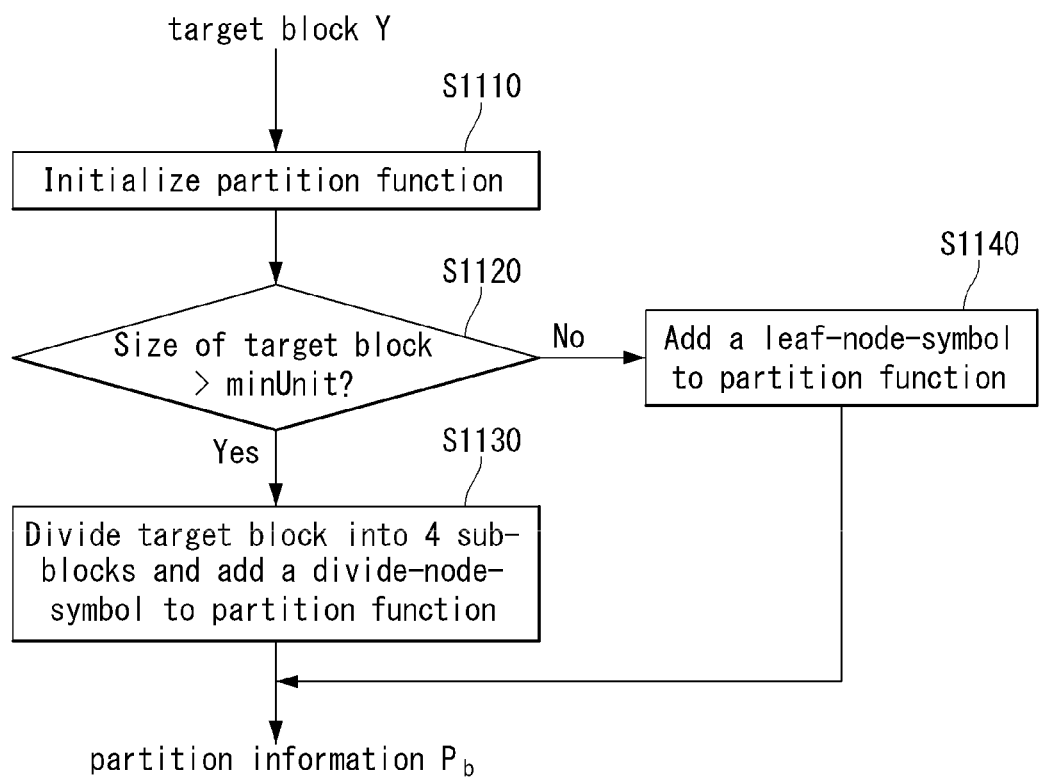

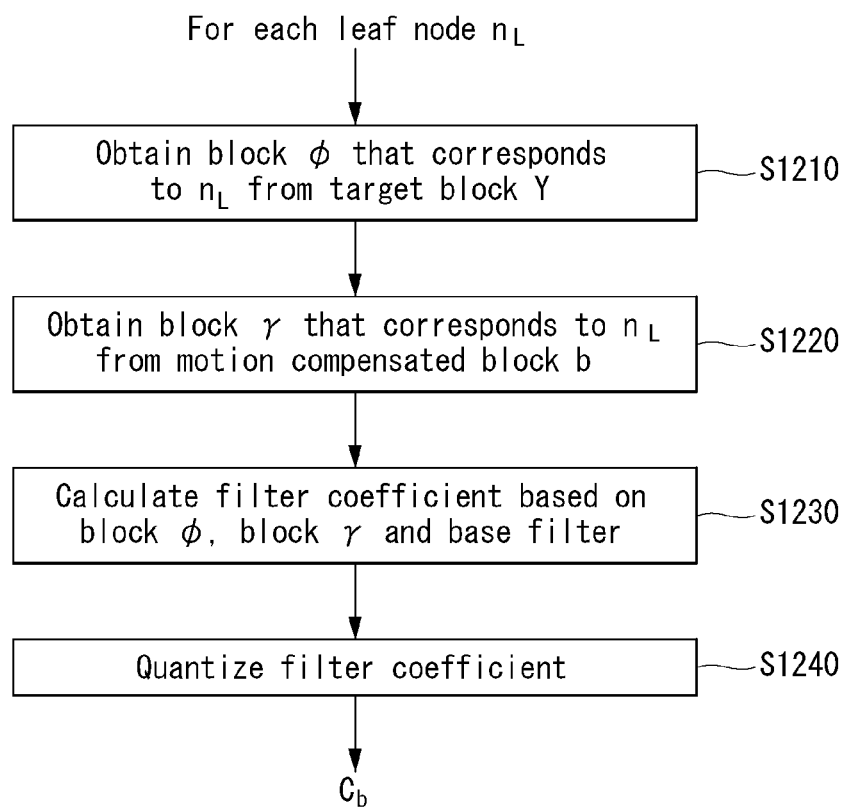
[Figure 12]

[Figure 13]
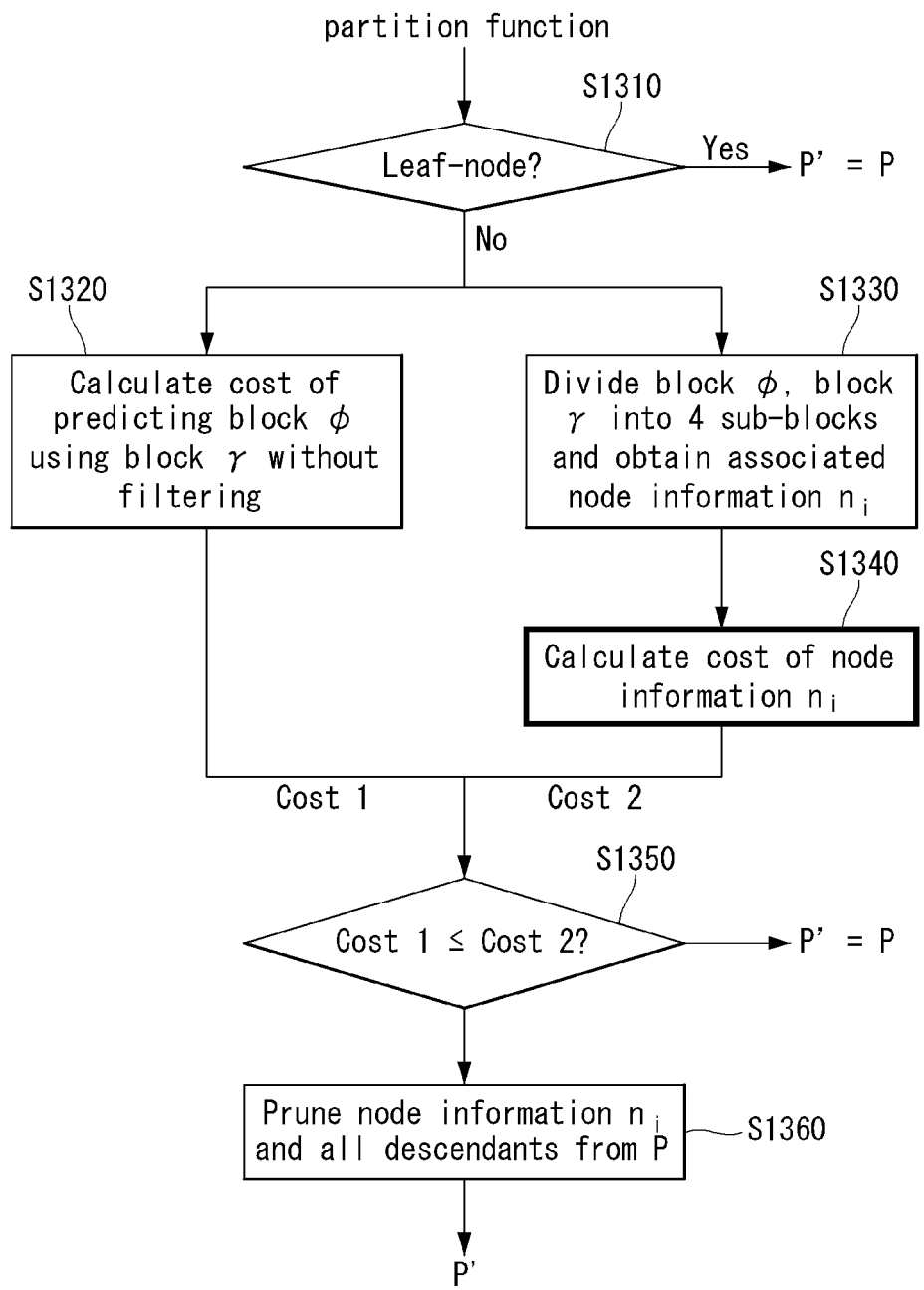

[Figure 14]
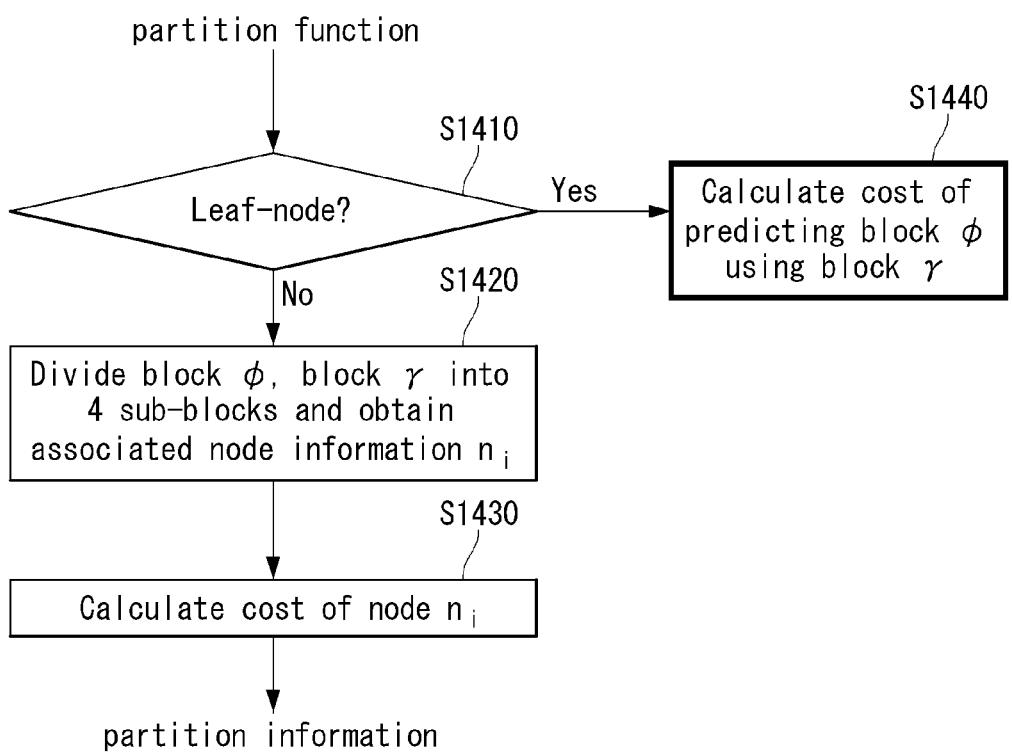

【Figure 15】
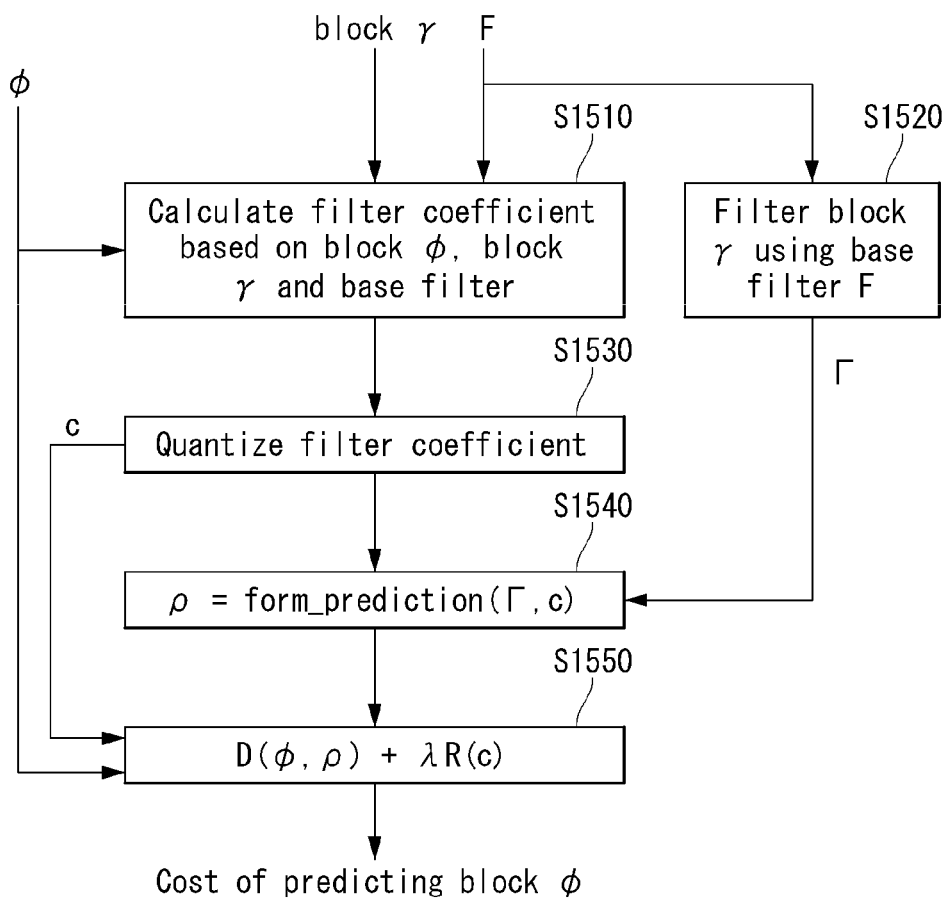

[Figure 16]
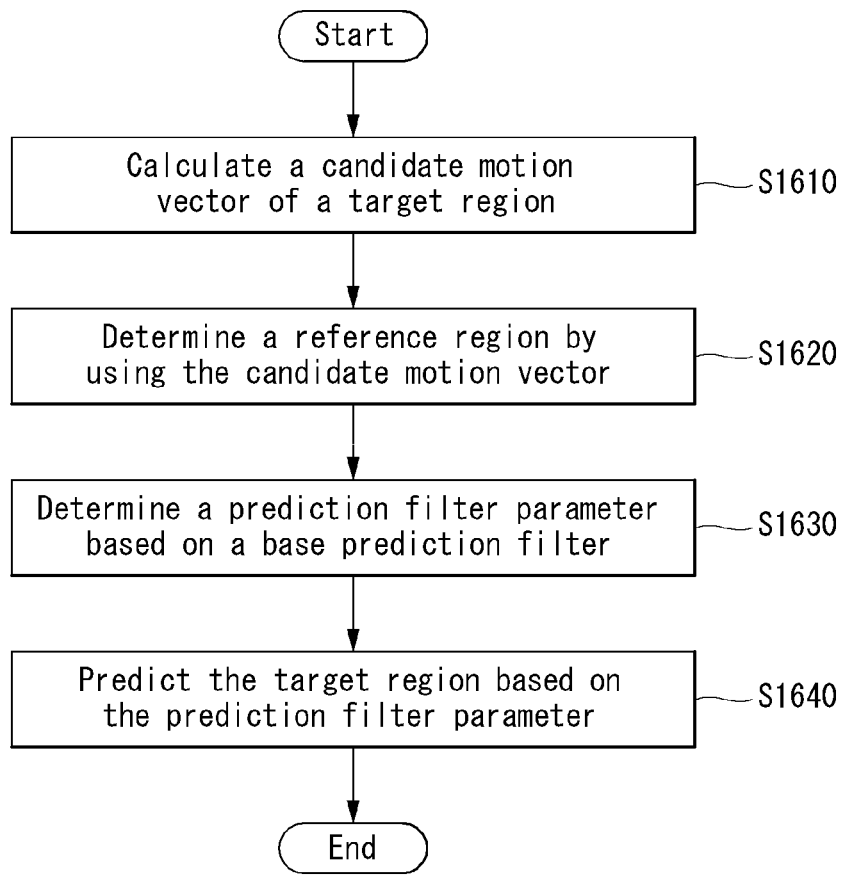

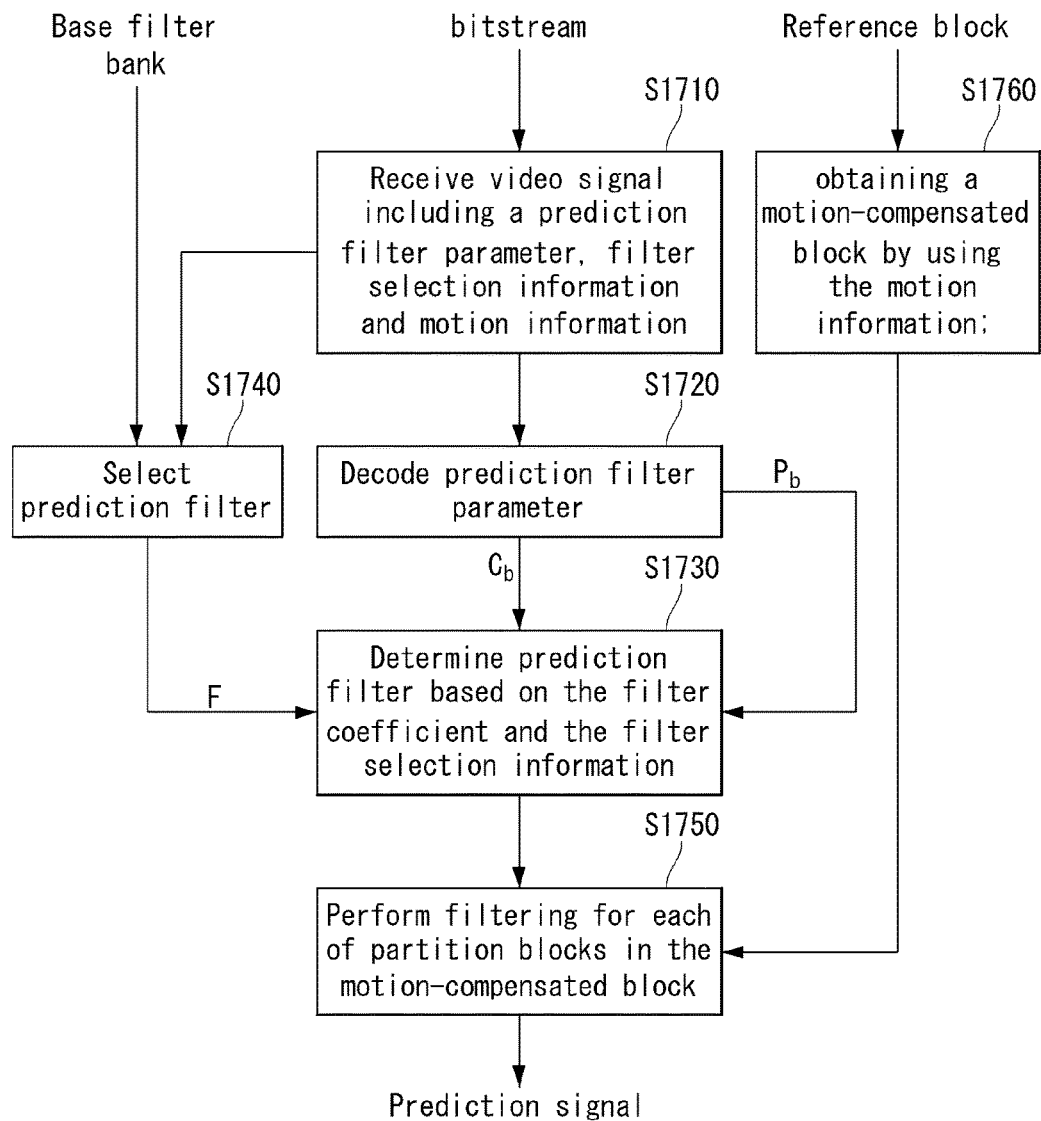
[Figure 17]

【Figure 18】
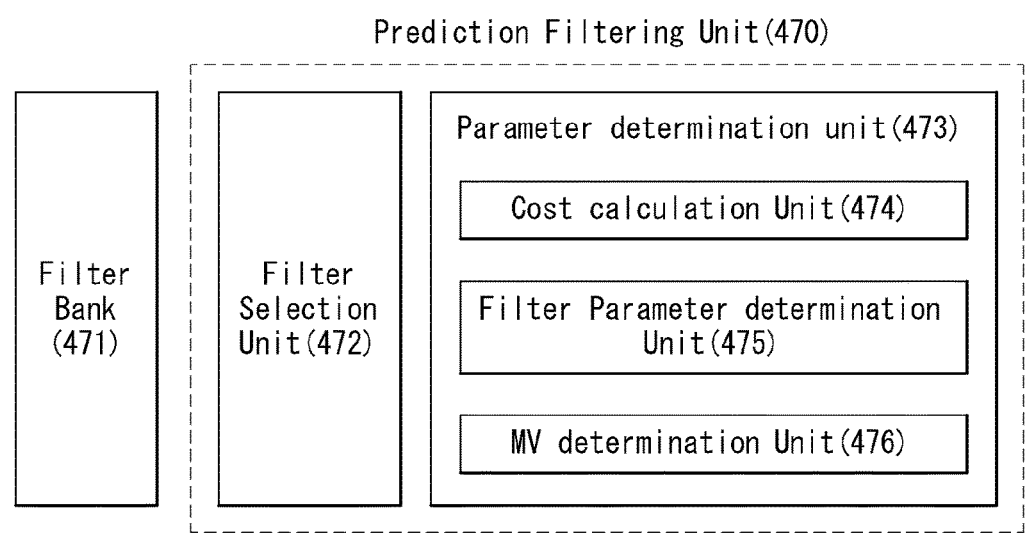

METHOD AND APPARATUS FOR ENCODING AND DECODING VIDEO SIGNAL USING IMPROVED PREDICTION FILTER

CROSS-REFERENCE TO RELATED APPLICATIONS

This application is the National Stage filing under 35 U.S.C. 371 of International Application No. PCT/KR2015/006465, filed on Jun. 25, 2015, which claims the benefit of U.S. Provisional Applications No. 62/058,628, filed on Oct. 1, 2014 and No. 62/063,350, filed on Oct. 13, 2014, the contents of which are all hereby incorporated by reference herein in their entirety.

TECHNICAL FIELD

The present invention relates to a method and apparatus for processing a video signal and, more particularly, to a technology for efficiently predicting a target region.

BACKGROUND ART

Compression coding means a series of signal processing technologies for sending digitalized information through a communication line or storing digitalized information in a form suitable for a storage medium. Media, such as video, an image, and voice, may be the subject of compression coding. In particular, a technology for performing compression coding on video is called video compression.

The next-generation video content expects to feature high spatial resolution, a high frame rate, and high dimensionality of a video scene representation. The processing of such content would require a significant increase in memory storage, a memory access rate, and processing power.

Accordingly, it is desirable to design a coding tool which address foreseen challenges and offer some solutions.

DISCLOSURE

Technical Problem

In an existing inter-prediction method, the target image is composed into fixed regions, such as rectangular regions, square regions, etc., and for each target region a displacement vector is calculated. The displacement vector identifies a corresponding region in the anchor image or the reference image. Such a displacement vector can be calculated by techniques such as motion estimation and motion compensation for video sequences.

Accordingly, it is necessary to provide a more efficient prediction method in the prediction process, and to design a prediction filter for enhancing the coding efficiency.

Technical Solution

An embodiment of the present invention provides a method of designing a coding tool for high efficiency compression.

Furthermore, an embodiment of the present invention provides a more efficient prediction method in the prediction process.

Furthermore, an embodiment of the present invention provides how to design a prediction filter for enhancing the coding efficiency.

Furthermore, an embodiment of the present invention provides how to parameterize a prediction filter in a novel way for enhancing the coding efficiency.

Furthermore, an embodiment of the present invention provides a method of designing a prediction filter applied to a picture for an inter-prediction in a process of encoding or decoding a video signal.

Furthermore, an embodiment of the present invention provides a method of better predicting the target region.

Advantageous Effects

The present invention can enable the design of a coding tool for high efficiency compression. The compression tool to which the present invention is applied can obtain the higher coding gain by removing noise in predicting the target region.

Furthermore, the present invention can provide a more efficient prediction method by designing a prediction filter, the noise of target image can be reduced by utilizing the designed prediction filter in motion compensated prediction of future frames, and thereby the coding efficiency can be enhanced.

DESCRIPTION OF DRAWINGS

FIGS. 1 and 2 illustrate schematic block diagrams of an encoder and decoder which process a video signal in accordance with embodiments to which the present invention is applied.

FIG. 3 represents a drawing illustrating how to predict a target image based on an anchor image in accordance with an embodiment to which the present invention is applied.

FIGS. 4 and 5 illustrate schematic block diagrams of an encoder and decoder which process a video signal using the designed filters in accordance with embodiments to which the present invention is applied.

FIG. 6 is a flowchart illustrating a method of forming a prediction block based on a prediction filter in accordance with an embodiment to which the present invention is applied.

FIG. 7 illustrates schematic block diagrams of an encoder which designs a prediction filter and a decoder which processes a video signal by using the prediction filter in accordance with embodiments to which the present invention is applied.

FIG. 8 is a flowchart illustrating a process of encoding a prediction filter parameter in accordance with an embodiment to which the present invention is applied.

FIG. 9 is a flowchart illustrating a process of determining a prediction filter parameter in accordance with an embodiment to which the present invention is applied.

FIG. 10 is a flowchart illustrating a process of obtaining an optimal filter coefficient and optimal partition information in accordance with an embodiment to which the present invention is applied.

FIG. 11 is a flowchart illustrating a process of obtaining partition information of blocks to which a full decomposition is applied in accordance with an embodiment to which the present invention is applied.

FIG. 12 is a flowchart illustrating a detailed process of obtaining an optimal filter coefficient in accordance with an embodiment to which the present invention is applied.

FIG. 13 is a flowchart illustrating a detailed process of obtaining optimal partition information in accordance with an embodiment to which the present invention is applied.

FIG. 14 is a flowchart illustrating a process of calculating a cost of partition blocks in accordance with an embodiment to which the present invention is applied.

FIG. 15 is a flowchart illustrating a process of calculating a cost of generating a prediction block in accordance with an embodiment to which the present invention is applied.

FIG. 16 is a flowchart illustrating a process of predicting a target region based on a prediction filter parameter in accordance with an embodiment to which the present invention is applied.

FIG. 17 is a flowchart illustrating a process of decoding a video signal including a prediction filter parameter in accordance with an embodiment to which the present invention is applied.

FIG. 18 represents a schematic block diagram of a prediction filtering unit (470) performing a prediction filtering in accordance with an embodiment to which the present invention is applied.

BEST MODE

In accordance with an aspect of the present invention, there is provided a method of encoding a video signal, comprising: selecting a set of base filter kernels from a filter bank; determining a prediction filter parameter based on the set of base filter kernels; performing a filtering of a reference region for a target region based on the prediction filter parameter; and predicting the target region based on the filtered reference region, wherein the prediction filter parameter includes at least one of modulation scalar and partition information.

In accordance with another aspect of the present invention, the determined prediction filter parameter minimizes a cost function which is comprised of variables including modulation scalars, partition information and base filter kernels.

In accordance with another aspect of the present invention, the present invention further comprises initializing a partition function; checking whether a size of the target region is larger than a predetermined minimum size; if the size of the target region is larger than the predetermined minimum size, dividing the target region into sub-blocks and adding a divide-node-symbol to the partition function, if the size of the target region is not larger than the predetermined minimum size, adding a leaf-node-symbol to the partition function; and obtaining the partition information based on the partition function.

In accordance with another aspect of the present invention, there is provided a method of decoding a video signal, comprising: receiving the video signal including a prediction filter parameter, filter selection information and motion information, wherein the prediction filter parameter includes modulation scalars and partition information; obtaining a reference block by using the motion information; determining a prediction filter based on the modulation scalars and base filter kernels; and performing a filtering for the reference block.

In accordance with another aspect of the present invention, the filtering is performed for each of partition blocks.

In accordance with another aspect of the present invention, the present invention further comprises obtaining a prediction block based on the filtered partition blocks; and reconstructing the video signal by using the prediction block.

In accordance with another aspect of the present invention, there is provided an apparatus of encoding a video signal, comprising: a filter selection unit configured to select a set of base filter kernels from a filter bank; a parameter determination unit configured to determine a prediction filter parameter based on the set of base filter kernels; a filtering unit configured to perform a filtering of a reference region for a target region based on the prediction filter parameter; and a prediction unit configured to predict the target region based on the filtered reference region, wherein the prediction filter parameter includes at least one of modulation scalar and partition information.

In accordance with another aspect of the present invention, the determined prediction filter parameter minimizes a cost function which is comprised of variables including modulation scalars, partition information and base filter kernels.

In accordance with another aspect of the present invention, the parameter determination unit is further configured to: initialize a partition function, check whether a size of the target region is larger than a predetermined minimum size, if the size of the target region is larger than the predetermined minimum size, divide the target region into sub-blocks and adding a divide-node-symbol to the partition function, if the size of the target region is not larger than the predetermined minimum size, add a leaf-node-symbol to the partition function, and obtain the partition information based on the partition function.

In accordance with another aspect of the present invention, there is provided an apparatus of decoding a video signal, comprising: a bitstream receiving unit configured to receive the video signal including a prediction filter parameter, filter selection information and motion information; and a prediction filtering unit configured to obtain a reference block by using the motion information, determine a prediction filter based on the modulation scalars and base filter kernels, and perform a filtering for the reference block, wherein the prediction filter parameter includes modulation scalars and partition information.

In accordance with another aspect of the present invention, the present invention further comprises a prediction unit configured to obtain a prediction block based on the filtered partition blocks; and a reconstruction unit configured to reconstruct the video signal by using the prediction block.

MODE FOR INVENTION

Hereinafter, exemplary elements and operations in accordance with embodiments of the present invention are described with reference to the accompanying drawings. It is however to be noted that the elements and operations of the present invention described with reference to the drawings are provided as only embodiments and the technical spirit and kernel configuration and operation of the present invention are not limited thereto.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be properly replaced and interpreted in each coding process.

FIGS. 1 and 2 illustrate schematic block diagrams of an encoder and decoder which process a video signal in accordance with embodiments to which the present invention is applied.

The encoder 100 of FIG. 1 includes a transform unit 110, a quantization unit 120, a dequantization unit 130, an inverse transform unit 140, a buffer 150, a prediction unit 160, and an entropy encoding unit 170.

The encoder 100 receives a video signal and generates a prediction error by subtracting a predicted signal, output by the prediction unit 160, from the video signal.

The generated prediction error is transmitted to the transform unit 110. The transform unit 110 generates a transform coefficient by applying a transform scheme to the prediction error.

The quantization unit 120 quantizes the generated transform coefficient and sends the quantized coefficient to the entropy encoding unit 170.

The entropy encoding unit 170 performs entropy coding on the quantized signal and outputs an entropy-coded signal.

Meanwhile, the quantized signal output by the quantization unit 120 may be used to generate a prediction signal. For example, the dequantization unit 130 and the inverse transform unit 140 within the loop of the encoder 100 may perform dequantization and inverse transform on the quantized signal so that the quantized signal is reconstructed into a prediction error. A reconstructed signal may be generated by adding the reconstructed prediction error to a prediction signal output by the prediction unit 160.

The buffer 150 stores the reconstructed signal for the future reference of the prediction unit 160.

The prediction unit 160 generates a prediction signal using a previously reconstructed signal stored in the buffer 150. In this case, the present invention concerns efficient prediction of a region in a target image using a region in an anchor image. Efficiency can be in compression rate-distortion sense or in terms of related metrics such as mean-squared-error that quantify the distortion in the prediction error.

To better predict the target region, an embodiment of the present invention will explain how to design a prediction filter for enhancing the coding efficiency, and how to process a video signal based on the prediction filter.

The decoder 200 of FIG. 2 includes an entropy decoding unit 210, a dequantization unit 220, an inverse transform unit 230, a buffer 240, and a prediction unit 250.

The decoder 200 of FIG. 2 receives a signal output by the encoder 100 of FIG. 1.

The entropy decoding unit 210 performs entropy decoding on the received signal. The dequantization unit 220 obtains a transform coefficient from the entropy-decoded signal based on information about a quantization step size. The inverse transform unit 230 obtains a prediction error by performing inverse transform on the transform coefficient. A reconstructed signal is generated by adding the obtained prediction error to a prediction signal output by the prediction unit 250.

The buffer 240 stores the reconstructed signal for the future reference of the prediction unit 250.

The prediction unit 250 generates a prediction signal using a previously reconstructed signal stored in the buffer 240.

The prediction method to which the present invention is applied will be used in both the encoder 100 and the decoder 200.

FIG. 3 represents a drawing illustrating how to predict a target image based on an anchor image in accordance with an embodiment to which the present invention is applied.

The target image can be composed into fixed regions, such as rectangular regions, square regions, etc., and for each target region a displacement vector can be calculated. The displacement vector identifies a corresponding region in the anchor image. Such a displacement vector can be calculated by techniques well known in the art such as motion estimation/compensation techniques for video sequences.

Concentrating on the target regions and matched anchor regions, the techniques of this invention can allow the matched anchor region to better predict the target region to facilitate applications like compression, denoising, spatio-temporal super-resolution, etc.

The anchor region x can be used to predict the target region y, via the following equation 1.

$$\hat{y} = \Sigma_{i=1}^{F} \alpha_i f_i * x => \text{need to modify} \quad \text{[Equation 1]}$$

In equation 1, K is an integral constant (K=1, 2, 4, 17, 179, etc.), $\alpha_i$ denotes modulation scalars, $f_i$ denotes two-dimensional filter kernels, and $f_i * x$ denotes linear convolution of the filter kernel $f_i$ with the anchor region.

It can be seen that the prediction $\hat{y}$ of the target region y can be formed by linearly filtering the anchor region x using the equivalent filter $f = \Sigma_{i=1}^{F} \alpha_i f_i$. The present invention provides a method of effectively designing such filters.

FIGS. 4 and 5 illustrate schematic block diagrams of an encoder and decoder which process a video signal using the designed filters in accordance with embodiments to which the present invention is applied.

The encoder 400 of FIG. 4 includes a transform unit 410, a quantization unit 420, a dequantization unit 430, an inverse transform unit 440, a buffer 450, a prediction unit 460, a prediction filtering unit 470 and an entropy encoding unit 480.

Comparing the encoder 400 with the encoder 100 of FIG. 1, the prediction filtering unit 470 is newly added to a block diagram of the encoder 100. Thus, the description of FIG. 1 can be similarly applied to FIG. 4, and the contents related to the prediction filtering unit 470 will be mainly explained hereinafter.

Furthermore, even though the prediction filtering unit 470 is placed as a separate functional unit after the prediction unit 460 in FIG. 4, this is an aspect of the present invention and the present invention is not limited thereto. For example, the function of the prediction filtering unit 470 can also be performed in the prediction unit 460.

The prediction unit 460 can perform a motion compensation using a displacement vector for a current block, and search a reference block, i.e. motion compensated block. In this case, the encoder 400 can transmit motion parameter to the decoder 500. The motion parameter represents information related to the motion compensation.

In an aspect of the present invention, the prediction filtering unit 470 can construct a prediction filter used for generating a prediction block.

And, the prediction filtering unit 470 can generate the prediction block using linear convolution of the prediction filter and a reference block. In this case, the reference block can represent a motion compensated block, as the anchor region.

In one embodiment, the prediction filter can be constructed by using filter kernels and modulation scalars. The encoder 400 and decoder 500 can share filter parameter, and the filter parameter represents parameter information related to the prediction filter. For example, the filter parameter can include at least one of filter coefficient and partition information.

Meanwhile, the decoder 500 of FIG. 5 includes an entropy decoding unit 510, a dequantization unit 520, an inverse transform unit 530, a buffer 540, a prediction unit 550 and a prediction filtering unit 560.

As described in FIG. 5, in an aspect of the present invention, the prediction filtering unit 560 can construct a prediction filter used for generating a prediction block.

And, the prediction filtering unit 560 can generate the prediction block using linear convolution of the prediction filter and a reference block.

In this case, at least one of filter parameter can be transmitted from the encoder 400. For example, the filter parameter can be transmitted for every inter-block from the encoder 400, or optionally transmitted from the encoder 400.

Comparing the decoder 500 with the decoder 200 of FIG. 2, the prediction filtering unit 560 is newly added to a block diagram of the decoder 200. Thus, the descriptions of FIGS. 1, 2 and 4 can be similarly applied to FIG. 5.

Furthermore, even though the prediction filtering unit 560 is placed as a separate functional unit after the prediction unit 550 in FIG. 5, this is an aspect of the present invention and the present invention is not limited thereto. For example, the function of the prediction filtering unit 560 can also be performed in the prediction unit 550.

FIG. 6 is a flowchart illustrating a method of forming a prediction block based on a prediction filter in accordance with an embodiment to which the present invention is applied.

The encoder to which the present invention is applied can construct a prediction filter for a current block (S610), as the below equation 2. The prediction filter can be constructed by using filter parameters. For example, the filter parameters can include filter kernels $f_k$ and modulation scalars $\alpha_i$ (k=1, ..., K).

$$g(m, n) = \sum_{k=1}^{K} f_k(m, n)\alpha_i \quad \text{[Equation 2]}$$

In this equation 2, m=1, ..., another character and n=1, ..., and K is an integral constant, $\alpha_i$ denotes modulation scalars, $f_k$ denotes two-dimensional filter kernels, and each scalar is floating point number.

And then, the encoder can form a prediction block using linear convolution based on the prediction filter, as the below equation 3.

$$\hat{y}(m, n) = \sum_{p,q=1}^{T} g(p, q)x(m - p, n - q) \quad \text{[Equation 3]}$$

In this equation 3, m=1, ..., B and n=1, ..., B, and g*x denotes linear convolution of the prediction filter with the anchor region. The anchor region can represent a reference block obtained after motion compensation.

The prediction ŷ of the target region y can be formed by linearly filtering the anchor region x using the prediction filter of equation 2.

Hereinafter, the present invention will provide various methods of effectively designing such filters.

In the process of video coding, designing general filters is difficult since such filters require many parameters, which must be learnt from limited data. Simple filters with reduced parameters are easier to learn but lead to unsatisfactory performance. Therefore, techniques that can specify effective filters with few parameters are hence highly desired.

In one embodiment, the filter kernels can be fixed and the modulation scalars can be computed to solve the constraint minimization as the following equation 4.

$$\min_\alpha \left\{ \left\| y - \sum_{i=1}^{F} \alpha_i f_i * x \right\|_q + \lambda C(\alpha_1, \alpha_2, \ldots, \alpha_F) \right\} \quad \text{[Equation 4]}$$

In equation 4, $\alpha=[\alpha_1 \ldots \alpha_F]^T$, $\|.\|_q$ denotes the q-norm (for an n-vector e, $\|e\|_q=(\Sigma_{j=1}^{n}|e_j|^q)^{1/q}$, q=0, 0.11, 1, 2, 2.561, etc.), $\lambda$ is a Lagrangian multiplier used to enforce the constraint $C(\alpha_1, \alpha_2, \ldots, \alpha_F) \leq c_0$, $c_0$ is a scalar, and $C(\alpha_1, \alpha_2, \ldots, \alpha_F)$ is a constraint function.

In a compression setting $C(\alpha_1, \alpha_2, \ldots, \alpha_F)$ can calculate the bits needed to communicate a so that the optimization finds the $\alpha$ that minimizes the q-norm of the prediction error subject to transmitting fewer than $c_0$ bits. $\Omega(\alpha)$ can also be set as $C(\alpha)=\|\alpha\|_p$ (p=0, 0.11, 1, 2, 2.561, etc).

The above minimization can solve the problem jointly in terms of $\alpha_1, \alpha_2, \ldots, \alpha_F$.

In one embodiment, the joint minimization can be simplified to scalar minimizations at some loss in accuracy by solving the following equation 5.

$$\min_{\alpha_i}\{\|f_i^* y - \alpha_i f_i^* x\|_q + \lambda_i \Omega(\alpha_i)\} \text{ for each } \alpha_i \quad \text{[Equation 5]}$$

The following equation 5 results in substantially easier solutions.

In one embodiment, the base filter kernels can be chosen to satisfy the following equation 6.

$$\sum_{i=1}^{F} f_i(k, l) = \delta(k, l) \quad \text{[Equation 6]}$$

$$\text{where } \delta(k, l) = \begin{cases} 1, & k = l \\ 0, & \text{otherwise} \end{cases}.$$

In one embodiment, the base filter kernels can be defined as the following equation 7.

$$f_i(k, l) = \frac{1}{2\pi} \iint_{(\omega_1,\omega_2) \in R_i} e^{\sqrt{-1}(\omega_1 k + \omega_2 l)} d\omega_1 d\omega_2 \quad \text{[Equation 7]}$$

In equation 7, $R=(-\pi,\pi]\times(-\pi,\pi]$ determine the square two-dimensional interval of area $\pi^2$, and the measurable sets $R_1, \ldots, R_F$ denote a decomposition of R so that $R=U_{i=1}^{F}R_i$ and $R_i \cap R_j = \emptyset$ whenever i≠j. And, $f_i$ is the inverse discrete-time Fourier transform of the indicator function of $R_i$.

Such filters may end up with non-compact support in spatial domain.

The base filter kernels can be optimized by using a training set of a video sequence.

In another embodiment, compact support filters can be designed to approximate the non-compact support filters. For example, filters whose support can be restricted to a compact region $\Omega$ in spatial domain (e.g., $\Omega$ could be a rectangular region that limits the total number of taps of $f_i$ to a prescribed number). Denoting the discrete-time Fourier transform of $f_i$ with $\varphi_i$, $$\chi_i(\omega_1, \omega_2) = \begin{cases} 1, & (\omega_1, \omega_2) \in R_i \\ 0, & \text{otherwise} \end{cases}$$

can be the indicator function of $R_i$. Given optimization weights $\beta_i \geq 0$, then the $f_i$ can be chosen to minimize the following equation 8.

$$\min \sum_{i=1}^{F} \left[ \beta_i \int\int_{-\pi}^{\pi} |\varphi_i(\omega_1, \omega_2) - \chi_i(\omega_1, \omega_2)|^r d\omega_1 d\omega_2 \right]$$ [Equation 8]

In this case, $\Sigma_{i=1}^{F} f_i(k,l) = (k,l)$ and $f_i(k,l) = 0$ if $(k,l) \notin \Omega$ ($r = 0$, 0.11, 1, 2, 2.561, etc.).

In another embodiment $\psi_i(\omega_1, \omega_2)$ are a given set of filters and the above minimization can be changed so that $f_i$ approximate $\psi_i$, as the below equation 9.

$$\min \sum_{i=1}^{F} \left[ \beta_i \int\int_{-\pi}^{\pi} |\varphi_i(\omega_1, \omega_2) - \psi_i(\omega_1, \omega_2)|^r d\omega_1 d\omega_2 \right]$$ [Equation 9]

where $\Sigma_{i=1}^{F} f_i(k,l) = \delta(k,l)$ and $f_i(k,l) = 0$ if $(k,l) \notin \Omega$.

In one embodiment, $f_i$ can be designed with the aid of a training set. Given a target and anchor image pair concentrate on the convolution in the prediction formation, $\hat{y} = \Sigma_{i=1}^{F} \alpha_i f_i * x$. Using the definition of convolution, equation 10 can be obtained.

$$\hat{y}(m, n) = \sum_{i=1}^{F} \alpha_i \sum_{(k,l) \in \Omega} f_i(k, l) x(m-k, n-l)$$ [Equation 10]

Lexicographically ordering the quantities into vectors, equation 11 can be obtained.

$$\hat{y}(m, n) = \begin{bmatrix} \dots & x(m-k, n-l) & \dots \end{bmatrix} \begin{bmatrix} \vdots & & \vdots \\ f_1(k, l) & \dots & f_F(k, l) \\ \vdots & & \vdots \end{bmatrix} \begin{bmatrix} \alpha_1 \\ \vdots \\ \alpha_F \end{bmatrix}$$ [Equation 11]

And, accommodating for all pixels (m,n) in the prediction, equation 12 can be obtained as follows.

$$\hat{y} = X \begin{bmatrix} f_1 & \dots & f_F \end{bmatrix} \begin{bmatrix} \alpha_1 \\ \vdots \\ \alpha_F \end{bmatrix} = Xf\alpha$$ [Equation 12]

Considering the lexicographically ordered target image, the optimal filters over the training set are obtained as the following equation 13.

$$\min_f \{\min_\alpha \{\|y - Xf\alpha\|_q + \lambda C(\alpha)\}\}$$ [Equation 13]

In another embodiment, the present invention can design filter kernels over training set as the below equation 14.

$$\operatorname*{argmin}_{f_1, f_2, \dots, f_K} \sum_{s=1}^{S} \min_\alpha \sum_{m,n=1}^{B} \left[ y_s(m, n) - \sum_{p,q=1}^{T} \left( \sum_{k=1}^{K} f_k(p, q) \alpha_k \right) x_s(m-p, n-q) \right]^2$$ [Equation 14]

In this case, training pair of blocks can be defined with $(y_1, x_1), (y_2, x_2), \dots, (y_s, x_s)$ (S is a large integer, e.g., 100, 1000, 119191, etc.).

And, the inner minimization $$\sum_{m,n=1}^{B} \left[ y_s(m, n) - \sum_{p,q=1}^{T} \left( \sum_{k=1}^{K} f_k(p, q) \alpha_k \right) x_s(m-p, n-q) \right]^2$$

of equation 14 can be replaced with other embodiments of FIG. 8, e.g. equations 15 to 18.

In one embodiment, the encoder-decoder pair can perform the same optimization over previously transmitted frames (or parts of frames) of video sequences and utilize the resulting filters in motion compensated prediction of future frames (or parts of frames remaining for transmission).

In one embodiment, the quad-tree or other region decomposition optimization can be done jointly with the above optimization for f. In another embodiment motion compensation, optical flow, denoising, and other processing related optimizations can be done jointly with the above optimization for f.

In one embodiment, the interpolation filters used in motion compensation can be combined with the designed filters to lower the total filtering complexity.

FIG. 7 illustrates schematic block diagrams of an encoder which designs a prediction filter and a decoder which processes a video signal by using the prediction filter in accordance with embodiments to which the present invention is applied.

The present invention assumes that the support of the 2D filter f is K×L, where K and L are integers greater than or equal to one. For example, the filter can be defined on an even or odd sized square, K=L=2k (k=1, 2, 3, . . . ), K=L=2k+1 (k=0, 1, 2, 3, . . . ).

Such a filter can be parameterized using KL filter tap values. In compression applications targeted in the present invention, a filter may be designed at the encoder for each x, y pair, and filter parameters may be sent to the decoder.

It should be appreciated that the more parameters the filter has the more difficult it is to convey these parameters over the communication channel at a given target bit rate.

One way to reduce parameters is to constrain f to be symmetric. Such a choice can reduce the number of parameters of f by roughly a factor of four in 2D. But the filtering and the prediction efficacy can be reduced since symmetric filters are inadequate enhancing and suppressing directional structures in anchor image regions.

Another way is to restrict the filter in frequency domain, for example constrain f to be low-pass, high-pass, band-pass, etc., by using bandwidth, pass-band, and stop-band parameters. But such an approach is also inadequate over directional and other sophisticated anchor image regions.

In the present invention, the filter f may be parameterized in terms of a set of base-filter kernels $f_i$, i=1, . . . l, as equation 15.

$$f(p, q) = \sum_{i=1}^{l} \alpha_i f_i(p, q) \qquad \text{[Equation 15]}$$

where l is an integral constant (l=1, 2, 4, 17, 179, etc.), $\alpha_i$ are modulation scalars, and $f_l$ are two-dimensional base-filter kernels.

In the present invention, the base-filter kernels may be known to both the encoder and the decoder, and one need only transmit the modulation scalars, $\alpha_i$, i=1, . . . , l. The resulting prediction filters will be referred to as condensed prediction filters (hereinafter, 'CPF'). The techniques of this invention concentrate on designing effective such filters.

In the present invention, the base-filter kernels may be known to the encoder/decoder pair and the filter adaptivity may be accomplished by computing and sending the modulation scalars, $\alpha_i$, i=1, . . . , l. It is hence needed to design base-filter kernels that can be used beneficially in compressing a wide variety of video sequences.

The present invention supposes one is given a training set of anchor image regions, $x_r$, and corresponding target image regions, $y_r$, r=1, . . . T, where T is the integer number of training pairs (T=1, 2, 3, 112, 1000, 1127276278, etc.). Each pair of regions is of the same spatial size but different pairs can have different spatial sizes.

For the $r^{th}$ training pair, the prediction of $y_r$ may be obtained using the CPF.

$$\tilde{f}_r(p, q) = \sum_{i=1}^{l} \alpha_{i,r} f_i(p, q), \qquad \text{[Equation 16]}$$

$$\hat{y}_r(m, n) = \sum_{p,q} \tilde{f}_r(p, q) x_r(m - p, n - q). \qquad \text{[Equation 17]}$$

Let $\alpha_r = [\alpha_{1,r}, \alpha_{2,r} \ldots \alpha_{l,r}]^T$, and then, the best modulation scalars in $l_2$ . . . norm sense for given base-filter kernels can be obtained for the $r^{th}$ pair by solving equation 18.

$$\min_{\alpha_r} \sum_{m,n \in R_r} \left( y_r(m, n) - \sum_{p,q} \tilde{f}_r(p, q) x_r(m - p, n - q) \right)^2, \qquad \text{[Equation 18]}$$

$$= \min_{\alpha_r} \sum_{m,n \in R_r} \left( y_r(m, n) - \sum_{p,q} \left( \sum_{i=1}^{l} \alpha_{i,r} f_i(p, q) \right) x_r(m - p, n - q) \right)^2$$

Referring to modulation scalars that accomplish the minimum as $\alpha_r^*$, the best base-filter kernels can be obtained by solving equation 19.

$$\min_{f_1, f_2, \ldots, f_l} \sum_{r=1}^{T} \left[ \sum_{m,n \in R_r} \left( y_r(m, n) - \right. \right. \qquad \text{[Equation 19]}$$

-continued $$\left. \left. \sum_{p,q} \left( \sum_{i=1}^{l} \alpha_{i,r} * f_i(p, q) \right) x_r(m - p, n - q) \right)^2 \right]$$

In this case, modulation scalars vary for each r, whereas the base-filter kernels are fixed.

In this specification, it is convenient to use vector notation in discussing optimization issues. Suppose $y_r$ and $f_i$ are lexicographically ordered into vectors. Lexicographically ordering the values, $x_r(m-p, n-q), p, q \in$ support $(f_r)$, into rows of the matrix $X_r$, the convolution $f_i * x_r$ can be represented by the matrix-vector multiplication, $X_r f_i$. Suppose further that the $f_i$ are placed as the columns of a matrix F.

$$\tilde{f}_r = F\alpha_r \qquad \text{[Equation 20]}$$

$$\hat{y}_r = X_r \tilde{f}_r = X_r F\alpha_r \qquad \text{[Equation 21]}$$

$$\alpha_r^* = \underset{\alpha_r}{\operatorname{argmin}} \|y_r - X_r F\alpha_r\|_2 \qquad \text{[Equation 22]}$$

$$F^* = \underset{F}{\operatorname{argmin}} \sum_{r=1}^{T} \|y_r - X_r F\alpha_r^*\|_2^2 \qquad \text{[Equation 23]}$$

In this equation, F is matrix.

Using the above vector notation, the present invention can consider the statistical model where the target vector is given as equation 24.

$$y = Xg_r + \omega, \qquad \text{[Equation 24]}$$

In this case, $g_r$ is an unknown filter, and $\omega$ is white noise that is independent of other quantities. Assume all quantities are zero mean. In the statistical viewpoint, the $r^{th}$ pair of anchor and target blocks are analogue to a random realization with respect to the above model given that $r^{th}$ filter $g_r$ has been drawn.

The mean-squared prediction error (MSE) can be obtained as equation 25.

$$E[\|y - XF\alpha_r\|_2^2 | r] \qquad \text{[Equation 25]}$$

In this case, $E[.|r]$, denotes expectation given r. Expanding leads to the following equation 26.

$$E[y^T y|r] - 2E[y^T X|r]F\alpha_r + \alpha_r^T F^T E[X^T X|r]F\alpha_r. \qquad \text{[Equation 26]}$$

Minimizing the MSE in terms of the modulation weights leads to the following equation 27, from which $\alpha_r$ can be solved.

$$F^T E[X^T y|r] = F^T E[X^T X|r]F\alpha_r, \qquad \text{[Equation 27]}$$

Since the noise is white, equation 28 can be used.

$$E[X^T y|r] = E[X^T X|r]g_r. \qquad \text{[Equation 28]}$$

In an embodiment of the present invention, suppose that $E[X^T X|r]$ is independent of r, i.e., $E[X^T X|r] = E[X^T X] = R$. Let G denote the matrix with the $r^{th}$ column equal to $g_r$. The following equations can be obtained.

$$F^T R g_r = F^T RF\alpha_r, \qquad \text{[Equation 29]}$$

The equation 29 can be rewritten for all r as equation 30.

$$F^T RG = F^T RFC, \text{ for all } r \qquad \text{[Equation 30]}$$

In this case, C is the matrix with $r^{th}$ column equal to $\alpha_r$.

Plugging the solution into the MSE, equation 31 can be obtained.

$$E[y^T y | r] - g_r^T RF\alpha_r. \quad \text{[Equation 31]}$$

Let p(r) determine the probability of r. Averaging over r leads to equation 32.

$$\sum_r (E[y^T y | r] - g_r^T RF\alpha_r) p(r), \quad \text{[Equation 32]}$$

The equation 32 can be reduced as equation 33.

$$E[y^T y] - \sum_r g_r^T RF\alpha_r p(r). \quad \text{[Equation 33]}$$

For convenience in notation, the present invention assumes that r is uniformly distributed. Then the second term in the sum becomes proportional to equation 34.

$$\text{Tr}[G^T RFC] = \sum_r g_r^T RF\alpha_r, \quad \text{[Equation 34]}$$

where Tr[.] denotes the trace of a matrix.

The joint optimization of the base-filter kernels and modulation weights can be provided as equation 35.

$$\max_{F,C} \text{Tr}[G^T RFC], \text{ subject to } F^T RG = F^T RFC. \quad \text{[Equation 35]}$$

In one embodiment, the present invention solves this system to result in base-filter kernels and modulation weights.

In one embodiment, a set of training pairs may be used to generate correlation and cross correlation statistics which are then used to obtain the above system.

In another embodiment, well-known statistical modeling techniques may be used to arrive at correlation and cross correlation statistics.

In one embodiment, the present invention may obtain a set of base-filter kernels using above mentioned training/design embodiments and use these filters in video compression. In this embodiment, the encoder/decoder have access to the derived base-filter kernels. The modulation weights may be determined during compression and sent to the decoder.

In one embodiment, more than one set of base-filter kernels may be designed for different training sets. These sets of base-filter kernels may be put inside a dictionary (storage) or database. Then, during compression, the encoder first selects a set of base-filter kernels and signals the selected base-filter kernels to the decoder. It then proceeds to encode the video sequence as mentioned in the above paragraph.

In one embodiment, a base-filter kernel and a modulation scalar can be scaled, and the modulation scalar can perform a more efficient compression while obtaining the same results of a prediction filtering by using a transform process. For example, if a prediction filtering is preformed via y=FC, when being performed as y=FCT$^{-1}$TC, it is possible to perform a more efficient compression by using a transform process (TC component).

FIG. 8 is a flowchart illustrating a process of encoding a prediction filter parameter in accordance with an embodiment to which the present invention is applied.

In one embodiment, the present invention may be applied to a video encoder or decoder. The present invention can select a set of base prediction filters F from a base prediction filter bank (or prediction filter bank or base prediction filter storage Ω) (S810). For example, the above process can be performed by a prediction filtering unit (470) and/or a filter selection unit (472).

The reference frame or anchor frame and the block to be compressed may be provided into a module which determines the motion vector and the CPF modulation weights. The module can determine a prediction filter parameter of a target block Y (S820). For example, the above process can be performed by a prediction filtering unit (470), a parameter determination unit (473) and/or a filter parameter determination unit (475).

The prediction filter parameter and the selection information can be encoded and sent in the compressed bit-stream to the decoder (S830). At the decoder, this process can be performed reversely.

The base prediction filter bank may be constructed using a training set of video sequences using optimizations.

Once prediction filter parameters are determined they can be sent to the decoder using methods well-known in the art. For example, the quad-tree partitioning is sent similar to the way partitioning information is sent in a video coding system. The prediction filter parameters are sent similar to transform coefficients are sent in the video coding system.

FIG. 9 is a flowchart illustrating a process of determining a prediction filter parameter in accordance with an embodiment to which the present invention is applied.

In an embodiment of the present invention, the encoder may a quad-tree decomposition for an anchor block, determine a CPF modulation weight for each leaf node. And, the encoder may filter the leaf node based on the corresponding CPF, and use the filtered result as the predicting block.

In an embodiment of the present invention, the prediction filter parameters may be determined by applying the present invention to a motion vector estimation process.

For each of motion vectors, a motion compensated block can be obtained by using a motion vector (S910). For example, a motion compensated candidate block can be obtained by using a candidate motion vector.

The prediction filtering unit (470) can find filter coefficient $C_b$ and partition information $P_b$ that minimize cost function cost(Y,b,$C_b$,$P_b$,F) (S920).

And, the prediction filtering unit (470) can check whether the cost function cost(Y,b,$C_b$, $P_b$,F) is smaller than a predetermined minimum value (minCost) (S930).

If the cost function cost(Y,b,$C_b$,$P_b$,F) is smaller than a predetermined minimum value (minCost), the filter coefficient $C_b^*$, the partition information $P_b^*$, a motion vector mv* and a minimum value of cost function may be set as values that satisfy the above condition (S940).

Then, the prediction filtering unit (470) can check whether there exists motion vector to additionally search (S950).

If there exists motion vector to additionally search, the above process can be performed recursively. But, if there does not exist motion vector to additionally search, the prediction filtering unit (470) can output the filter coefficient $C_b^*$, the partition information $P_b^*$, a motion vector mv* and a minimum value of cost function as the optimal values.

FIG. 10 is a flowchart illustrating a process of obtaining an optimal filter coefficient and optimal partition information in accordance with an embodiment to which the present invention is applied.

In an embodiment of the present invention, a minimum unit minUnit, a target block Y, a reference block b and a base prediction filter F, the prediction filtering unit (470) can find prediction filter parameters that jointly minimize cost function.

First, the prediction filtering unit (470) can construct initial partition information $P_{full}$, as a quadtree (S1010). The initial partition information $P_{full}$ can be defined as equation 36.

$$P_{full} = \text{constructFullTree}(Y, minUnit) \quad \text{[Equation 36]}$$

For example, a value of a minimum unit minUnit can be set to 4.

Then, the prediction filtering unit (470) can obtain an optimal filter coefficient $C_b$ and optimal partition information $P_b$ based on the initial partition information $P_{full}$ (S1020).

For example, optimal filter coefficient $C_b$ and optimal partition information $P_b$ can be obtained by equation 37.

$$C_b, P_b, \text{cost} = \text{FindBestCoefficientandPartition}(P_{full}, Y, b, F) \quad \text{[Equation 37]}$$

FIG. 11 is a flowchart illustrating a process of obtaining partition information of blocks to which a full decomposition is applied in accordance with an embodiment to which the present invention is applied.

First, initial partition information $P_{full}$, can be initialized (S1110).

The prediction filtering unit (470) can check whether a size of a target block Y is larger than a minimum unit minUnit (S1120).

If the size of the target block Y is larger than the minimum unit minUnit, the prediction filtering unit (470) can divide the target block Y into 4 sub-blocks $\varphi_i$ (i=1, 2, 3, 4) and add a divide-node-symbol to partition function P={P, D} (S1130).

For example, for i=1, 2, 3, 4, partition information $P_b$ can be constructed as equation 38.

$$P_b = \{P, \text{constructFullTree}(\varphi_i, minUnit)\} \quad \text{[Equation 38]}$$

However, if a size of a target block Y is not larger than a minimum unit minUnit, the prediction filtering unit (470) can add a leaf-node-symbol to partition function P={P, L} (S1140).

FIG. 12 is a flowchart illustrating a detailed process of obtaining an optimal filter coefficient in accordance with an embodiment to which the present invention is applied.

In an embodiment of FIG. 12, the present invention provides a detailed method for obtaining an optimal filter coefficient.

For finding the optimal prediction filter parameter, the partition information $P_b$ can be defined as equation 39.

$$P_b = \text{Prune\_tree}(P_{full}, Y, b, F) \quad \text{[Equation 39]}$$

For each leaf node $n_L$ in $P_b$, the prediction filtering unit (470) can obtain a block $\varphi$ that corresponds to $n_L$ from a target block Y (S1210), and obtain a block γ that corresponds to $n_L$ from a motion compensated block b (S1220). In this case, block $\varphi$ indicates a partitioning block corresponding to each leaf node within the target block Y, and the block γ indicates a partitioning block corresponding to each leaf node within the motion compensated block Y.

The prediction filtering unit (470) can calculate filter coefficient based on the block $\varphi$, the block γ and the base prediction filter as equation 40.

$$C = \text{calculate\_c}(\varphi, \gamma, F) \quad \text{[Equation 25]}$$

And then, the calculated filter coefficient can be quantized as equation 41.

$$\hat{C}, q = \text{Quantize}(c) \quad \text{[Equation 41]}$$

FIG. 13 is a flowchart illustrating a detailed process of obtaining optimal partition information in accordance with an embodiment to which the present invention is applied.

Given partition function for obtaining partition information as equation 39, the prediction filtering unit (470) can check whether a current block corresponds to a leaf node (S1310).

If a current block corresponds to a leaf node, the prediction filtering unit (470) can construct partition function P as partition information P'.

However, if a current block does not correspond to a leaf node, the prediction filtering unit (470) can calculate a cost of predicting a block $\varphi$ using a block γ without filtering (S1320).

Through the above calculation, the prediction filtering unit (470) can obtain Cost 1.

Furthermore, if a current block does not correspond to a leaf node, the prediction filtering unit (470) can divide a block $\varphi$, a block γ into 4 sub-blocks $\varphi_i$, $\gamma_i$ (i=1, 2, 3, 4) and obtain associated node information $n_i$ (S1330).

And, the prediction filtering unit (470) can calculate a cost of node information $n_i$ based on equation 42 (S1340).

$$\sum_{i=1}^{4} \text{calculate\_cost\_of\_node}(P, ni, F, \varphi i, \gamma i) \quad \text{[Equation 42]}$$

Through equation 42, the prediction filtering unit (470) can obtain Cost 2.

Then, the prediction filtering unit (470) can check whether Cost 1 is small than or equal to Cost 2 (S1350). That is, when a current block does not correspond to a leaf node, the prediction filtering unit (470) can select more efficient way by calculating and comparing a cost of a block predicted without a filtering and a cost of nodes divided into sub-blocks.

If Cost 1 is small than or equal to Cost 2, the prediction filtering unit (470) can prune node information $n_i$ and all descendants from the partition function P (S1360).

Meanwhile, if Cost 1 is larger than Cost 2, the prediction filtering unit (470) can construct partition function P as partition information P'.

FIG. 14 is a flowchart illustrating a process of calculating a cost of partition blocks in accordance with an embodiment to which the present invention is applied.

In an embodiment of the present invention, a process of calculating a cost of partition blocks as equation 42 will be explained in detail.

The prediction filtering unit (470) can calculate a cost of node information $n_i$ as equation 42.

First, the prediction filtering unit (470) can check whether the node information $n_i$ corresponds to a leaf node (S1410).

If the node information $n_i$ corresponds to a leaf node, the prediction filtering unit (470) can calculate a cost of predicting a block $\varphi$ using a block γ(S1420). The process for calculating a cost of predicting a block $\varphi$ will be explained in FIG. 15.

However, if a current block does not correspond to a leaf node, the prediction filtering unit (470) can divide a block φ, a block γ into 4 sub-blocks $φ_i$, $γ_i$ (i=1, 2, 3, 4) and obtain associated node information $n_i$ (i=1, 2, 3, 4) (S1430).

And, the prediction filtering unit (470) can calculate a cost of node information $n_i$ according to the equation 42 (S1440).

FIG. 15 is a flowchart illustrating a process of calculating a cost of generating a prediction block in accordance with an embodiment to which the present invention is applied.

In an embodiment of the present invention, the present invention provides a method for calculating a cost of predicting a block φ.

The prediction filtering unit (470) can calculate filter coefficient based on a block φ, a block y and a base prediction filter F (S1510). For example, equation 40 can be utilized for calculating the filter coefficient.

And, the calculated filter coefficient can be quantized (S1520). For example, equation 41 can be utilized for quantizing the filter coefficient.

The prediction filtering unit (470) can form a prediction signal by using a prediction function as equation 43 (S1530).

$$ρ=form\_prediction(Γ,c)$$ [Equation 43]

In equation 43, ρ indicates a prediction signal, and Γ indicates a filtered block. Γ may be represented by $Γi=y*f_i$, y represents a block and $f_i$ represents filter kernels.

Meanwhile, given the base prediction filter F, the prediction filtering unit (470) can perform a filtering of block y by using the base prediction filter F (S1540).

The filtered block Γ can be utilized to form a prediction signal in S1530.

Then, the prediction filtering unit (470) can calculate a cost of predicting block φ by using equation 44.

$$D(φ,ρ)+λR(c)$$ [Equation 44]

In equation 44, D indicates the distortion (e.g., MSE) between the two blocks, and R indicates the rate obtained for encoding ĉ using a transform unit.

FIG. 16 is a flowchart illustrating a process of predicting a target region based on a prediction filter parameter in accordance with an embodiment to which the present invention is applied.

The present invention provides an encoding process of predicting a target region based on a prediction filter parameter.

The encoder can calculate a candidate motion vector of a target region (S1610), and determine a reference region by using the candidate motion vector (S1620).

The encoder can determine a prediction filter parameter based on a base prediction filter (S1630). In this case, the prediction filter parameter includes at least one of a filter coefficient and partition information, and is determined to minimize a cost function.

The base prediction filter may be selected from a predefined prediction filter bank.

Various embodiments for determining the prediction filter parameter are able to be applied to this embodiment.

The encoder can predict the target region based on the prediction filter parameter (S1640).

FIG. 17 is a flowchart illustrating a process of decoding a video signal including a prediction filter parameter in accordance with an embodiment to which the present invention is applied.

The present invention provides a method of decoding a video signal including a prediction filter parameter.

The decoder can receive video signal including at least one of a prediction filter parameter, filter selection information and motion information (S1710).

The decoder can obtain the prediction filter parameter from the video signal and decode the prediction filter parameter (S1720). In this case, the prediction filter parameter includes at least one of a filter coefficient and partition information. In another embodiment, the prediction filter parameter can be derived from other information in a decoder.

The decoder can determine a prediction filter based on at least one of the filter coefficient and the filter selection information (S1730). In this case, the filter selection information can be extracted from the video signal or derived from other information. The decoder can select a prediction filter to be used from the base prediction filter bank based on the filter selection information (S1740).

The decoder can perform a filtering for each of partition blocks in a motion-compensated block based on partition information (S1750).

Meanwhile, the decoder can obtain a motion-compensated block by using the motion information (S1760). The obtained motion-compensated block can be used in S1750.

FIG. 18 represents a schematic block diagram of a prediction filtering unit (470) performing a prediction filtering in accordance with an embodiment to which the present invention is applied.

A prediction filtering unit (470) to which the present invention is applied includes a filter selection unit (472) and a parameter determination unit (473), and the parameter determination unit (473) includes a cost calculation unit (474), a filter parameter determination unit (475) and a MV (Motion Vector) determination unit (476). The FIG. 18 shows that the prediction filtering unit (470) is located as a separate functional unit in an encoder, but this is an embodiment of the present invention and the present invention is not limited to that. For example, the prediction filtering unit (470) can be located in a prediction unit (460), or located between other units. Furthermore, a filter bank (741) can be also located separately with the prediction filtering unit (470), but this is also an embodiment of the present invention and the present invention is not limited to that. For example, the filter bank (741) can be included and used in the prediction filtering unit (470) or the prediction unit (460), or can be included and used in an external or separate storage. These can be applied similarly to a decoder.

The prediction filtering unit (470) can generate a prediction block using a linear convolution of a prediction filter and a reference block.

First, the filter selection unit (472) can select a set of base prediction filters from the filter bank (471) (or prediction filter bank, or base prediction filter storage Ω).

The parameter determination unit (473) can determine a prediction filter parameter by referring to a reference frame (or anchor frame) and a coding block, and determine a motion vector and a CPF modulation weight based on the prediction filter parameter. At least one of the prediction filter parameter and selection information can be encoded and transmitted as a compressed bitstream to a decoder, and the decoder can perform that reversely.

The cost calculation unit (474) can utilize the equation 36 and 37 for obtaining a filter coefficient $C_b$ which minimizes a cost function $cost(Y,b,C_b,P_b, F)$ and partition information $P_b$.

The filter parameter determination unit (475) can check whether the cost function $cost(Y,b,C_b,P_b,F)$ is smaller than a predetermined minimum value (minCost). For example, if the cost function cost(Y,b,$C_b$,$P_b$,F) is smaller than the predetermined minimum value (minCost), the obtained filter coefficient $C_b$* and the partition information $P_b$* may be set as values of the prediction filter parameters.

And, the MV (Motion Vector) determination unit (476) can check whether there exists motion vector to additionally search. If there exists motion vector to additionally search, the above process can be performed recursively.

However, if there does not exist motion vector to additionally search, the filter coefficient $C_b$*, the partition information $P_b$*, and a motion vector mv*, which minimize the cost function cost(Y,b,$C_b$,$P_b$,F), can be determined as the optimal values.

As described above, the embodiments explained in the present invention may be implemented and performed on a processor, a micro processor, a controller or a chip. For example, functional units explained in FIGS. 1, 2, 4, 5 and 18 may be implemented and performed on a computer, a processor, a micro processor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional (3D) video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves (e.g., transmission through the Internet). Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method of encoding a video signal, comprising:
selecting a set of base filter kernels from a filter bank;
determining a prediction filter parameter to minimize a cost function, wherein the cost function is comprised of a modulation scalar, partition information, and base filter kernels;
performing a filtering of a reference region for a target region based on the prediction filter parameter; and
predicting the target region based on the filtered reference region,
wherein the prediction filter parameter includes the modulation scalar and the partition information, and wherein the partition information is information indicating a division structure of the target region.

2. The method of claim 1, further comprising:
initializing a partition function, wherein the partition function represents $P_{full}$=constructFullTree(Y, minUnit), and wherein Y represents the target region and minUnit represents a predetermined minimum size;
checking whether a size of the target region is larger than the predetermined minimum size;
if the size of the target region is larger than the predetermined minimum size, dividing the target region into sub-blocks and adding a divide-node-symbol to the partition function,
if the size of the target region is not larger than the predetermined minimum size, adding a leaf-node-symbol to the partition function; and
obtaining the partition information based on the partition function.

3. A method of decoding a video signal, comprising:
receiving the video signal including a prediction filter parameter, filter selection information and motion information, wherein the prediction filter parameter includes modulation scalars and partition information, and wherein the filter selection information is an index indicating a set of base filter kernels stored in a filter bank;
obtaining a reference block by using the motion information;
determining a prediction filter based on filter selection information; and
performing a filtering for the reference block based on the prediction filter parameter and the prediction filter,
wherein the prediction filter parameter has been determined to minimize a cost function which is comprised of the modulation scalars, the partition information, and base filter kernels, and
wherein the partition information is information indicating a division structure of a target region.

4. The method of claim 3, wherein the filtering is performed for each of partition blocks based on the partition information.

5. The method of claim 3, further comprising:
obtaining a prediction block based on the filtered reference block; and
reconstructing the video signal by using the prediction block.

6. An apparatus of encoding a video signal, comprising:
a processor configured to
select a set of base filter kernels from a filter bank;
determine a prediction filter parameter to minimize a cost function, wherein the cost function is comprised of a modulation scalar, partition information, and base filter kernels;
perform a filtering of a reference region for a target region based on the prediction filter parameter; and
predict the target region based on the filtered reference region,
wherein the prediction filter parameter includes the modulation scalar and the partition information, and
wherein the partition information is information indicating a division structure of the target region.

7. The apparatus of claim 6,
wherein the processor is further configured to:
initialize a partition function, wherein the partition function represents $P_{full}$=constructFullTree(Y, minUnit), and wherein Y represents the target region and minUnit represents a predetermined minimum size,
check whether a size of the target region is larger than the predetermined minimum size,
if the size of the target region is larger than the predetermined minimum size, divide the target region into sub-blocks and adding a divide-node-symbol to the partition function,
if the size of the target region is not larger than the predetermined minimum size, add a leaf-node-symbol to the partition function, and
obtain the partition information based on the partition function.

8. An apparatus of decoding a video signal, comprising:
a processor configured to
receive the video signal including a prediction filter parameter, filter selection information and motion information, wherein the prediction filter parameter includes modulation scalars and partition information, and wherein the filter selection information is an index indicating a set of base filter kernels stored in a filter bank; and
obtain a reference block by using the motion information,
determine a prediction filter based on the filter selection information, and
perform a filtering for the reference block based on the prediction filter parameter and the prediction filter,
wherein the prediction filter parameter has been determined to minimize a cost function which is comprised of the modulation scalars, the partition information, and base filter kernels, and
wherein the partition information is information indicating a division structure of a target region.

9. The apparatus of claim 8, wherein the filtering is performed for each of partition blocks based on the partition information.

10. The apparatus of claim 8, further comprising:
the processor configured to obtain a prediction block based on the filtered reference block, and
reconstruct the video signal by using the prediction block.

* * * * *